Patented Aug. 11, 1936

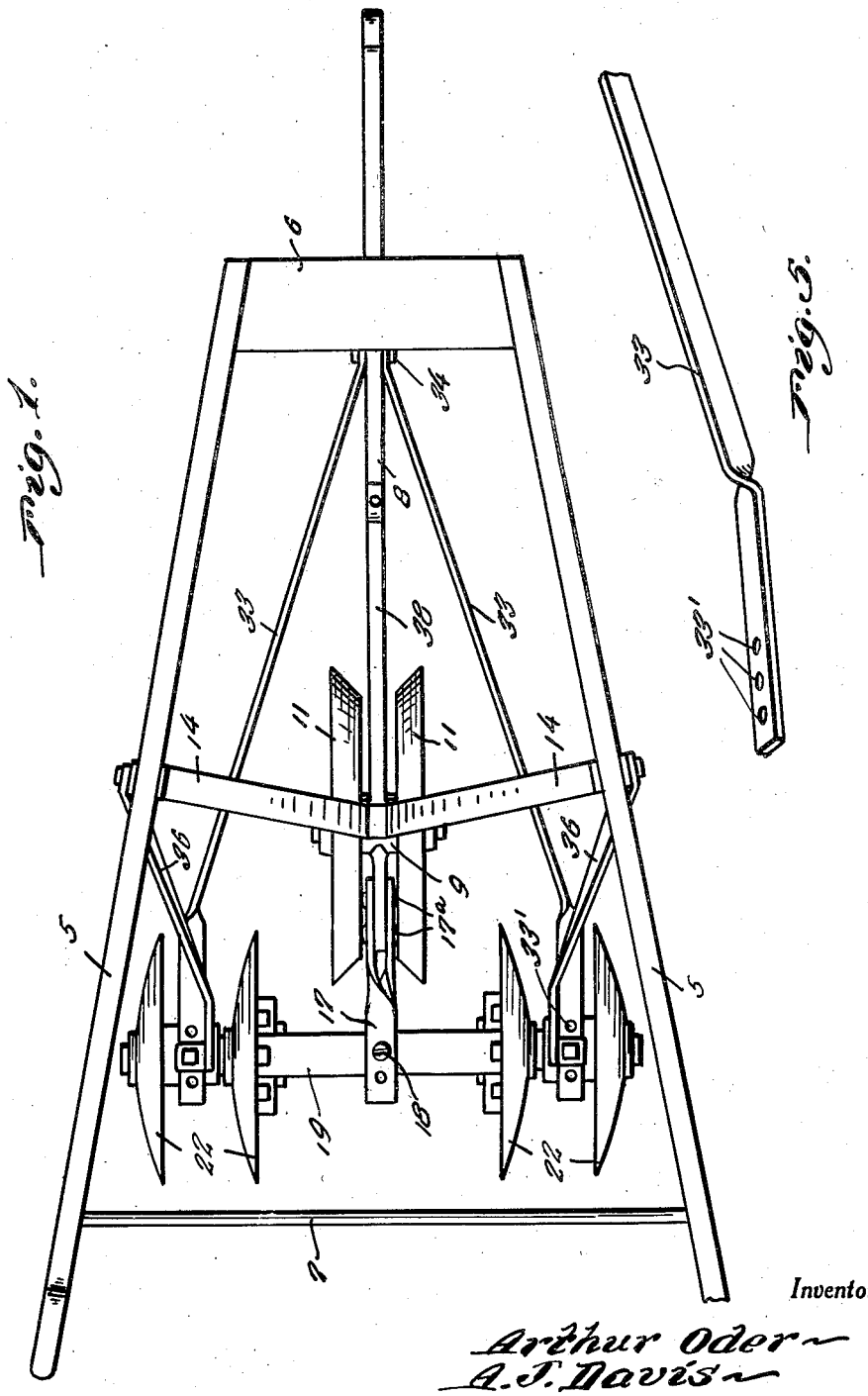

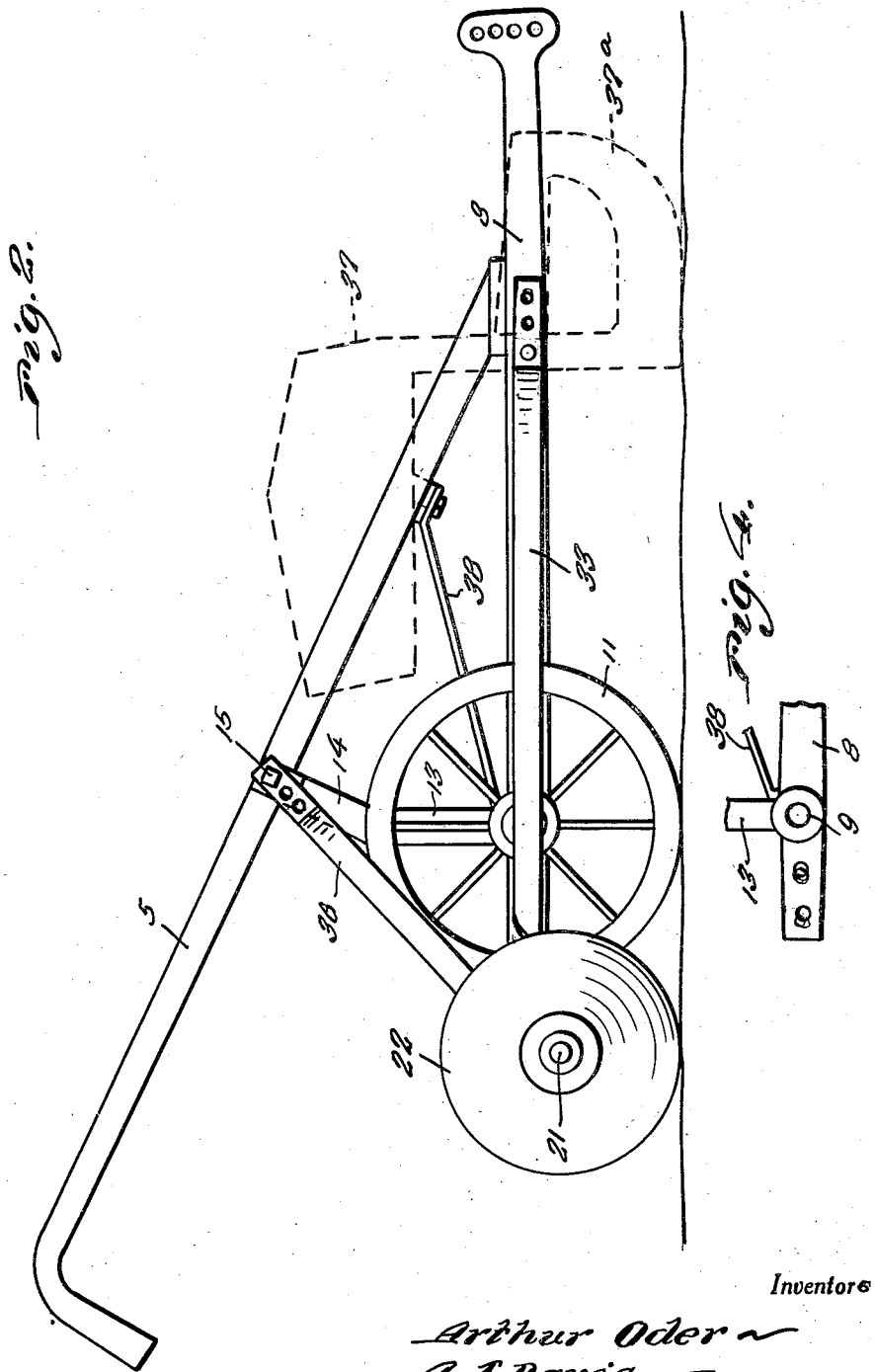

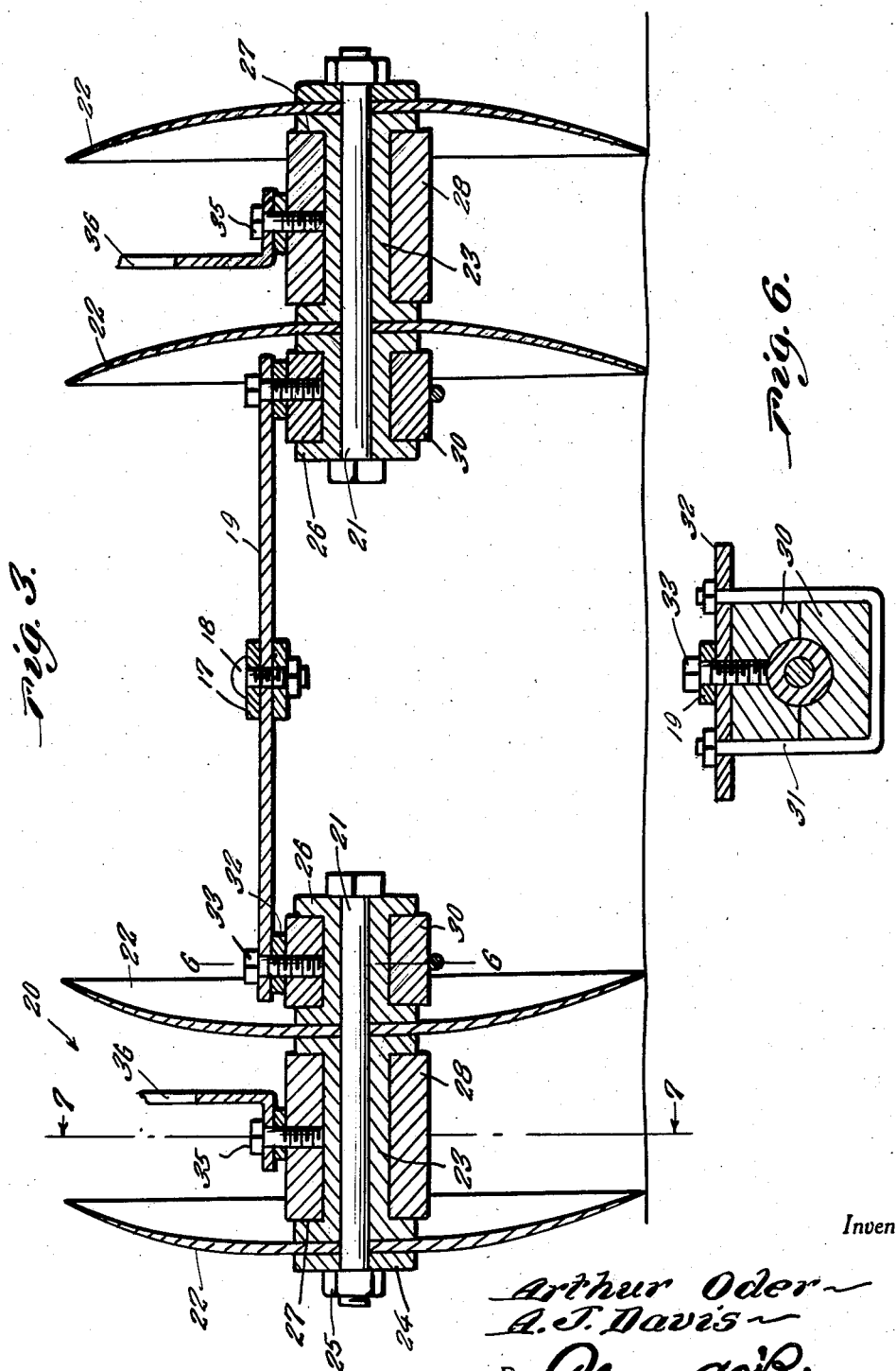

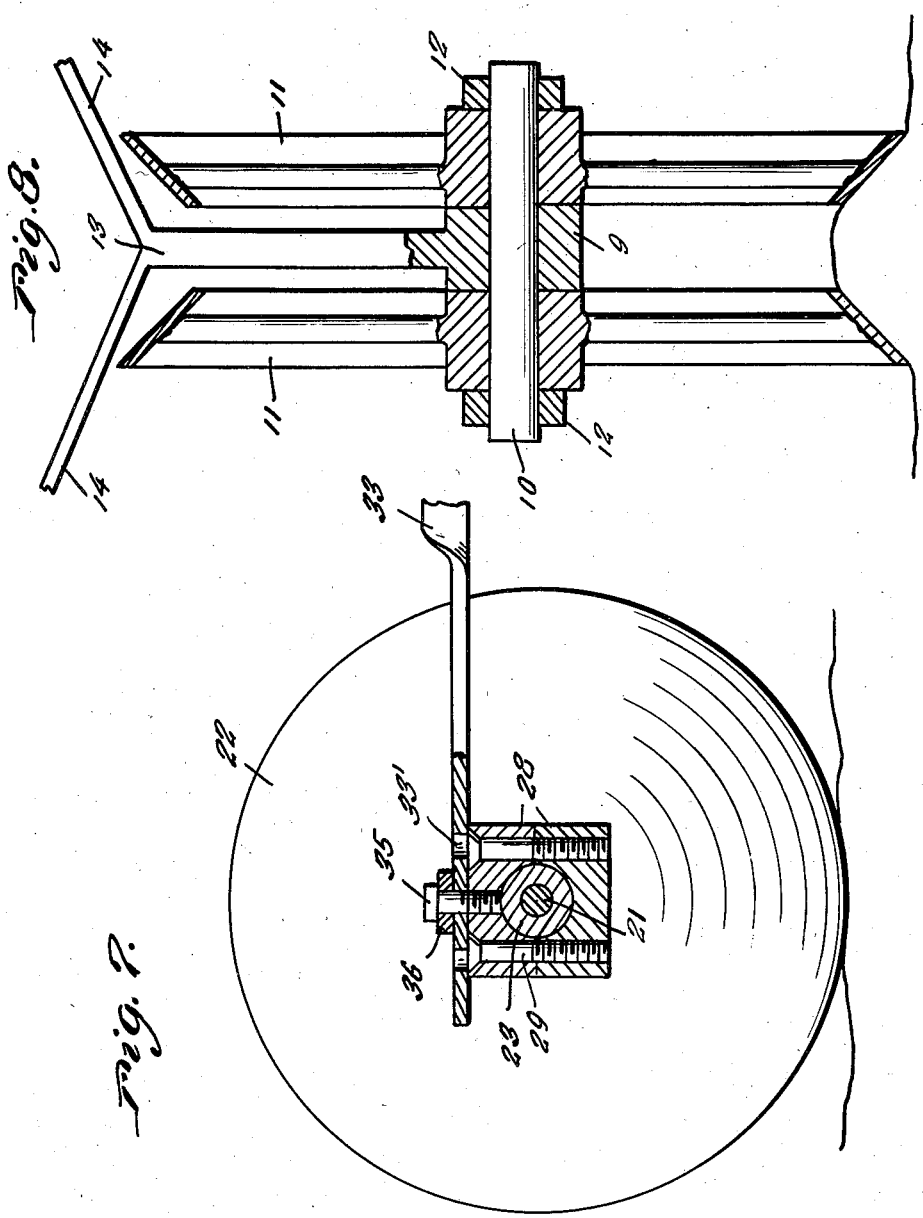

2,050,454

UNITED STATES PATENT OFFICE 2,050,454

AGRICULTURAL IMPLEMENT

Arthur Oder and Andrew J. Davis, Bell, Fla.

Application November 12, 1935, Serial No. 49,405

3 Claims. (Cl. 97—56)

This invention relates broadly to the class of farm and agricultural implements and machines and more particularly to a machine of this character and generally known in the art as a "rounder".

An object of the present invention is to provide a rounder characterized by simplicity of construction as well as efficiency of operation; and further to provide a rounder which can be readily associated with a conventional planter structure.

The invention together with its objects and advantages will be best understood from a study of the following description taken in connection with the accompanying drawings wherein:

Figure 1 is a top plan view of the rounder.

Figure 2 is a side elevational view thereof illustrating the application of the same to a planter.

Figure 3 is a transverse sectional view taken through the disk assembly of the machine.

Figure 4 is a fragmentary elevational view of the hub portion of a draw bar.

Figure 5 is a perspective view of a brace member.

Figures 6 and 7 are detail sectional views taken substantially on the lines 6—6 and 7—7 respectively of Figure 3, and Figure 8 is a detail sectional view through the draft bar and wheel assembly associated therewith.

Referring to the drawings by reference numerals it will be seen that I have illustrated a more or less conventional planter which includes among other parts the inclined, divergent handle bars 5 which at their lower converging ends are secured to the opposite ends of a cross bar 6 which together with the lower portions of the handles 5 suitably support the seed box and associated parts shown in the drawings and indicated by the reference numerals 37 and 37a respectively. The draw bar of the planter is indicated by the numeral 8 and extends forwardly underneath the bar 6, and adjacent its rear end is provided with a hub 9 in which is accommodated the intermediate portion of an axle 10 upon which are mounted a pair of planter wheels 11 of conventional structure. The wheels are retained on the axle through the medium of the hub 9 and collars 12.

The handle bars 5 of the planter are braced with respect to the axle through the medium of a substantially Y-shaped structure consisting of a shank 13 secured to the hub in any suitable manner, preferably by being integral therewith, and merging in a pair of oppositely extending arms 14 that extend upwardly and outwardly and are secured at their free ends to the handles through the medium of bolts or the like 15.

The planter box is braced with respect to the beam or draft bar 8 through the medium of a suitable brace member 38.

The upper ends of the handle bars 5 are connected by a cross bar 7.

The structure above described is substantially conventional to planters of the character suggested.

The improved "rounder" assembly comprises a cross beam 19 which intermediate its ends is pivotally connected, in adjustable manner, as indicated, for example, at 18 to a draft member 17 which is suitably secured as at 17a to the beam extension 8 projecting rearwardly from the hub 9 and as best shown in Figure 1. Thus, as will be more manifest as the description proceeds, the bar 19 may be swung to any angle for placing the disk 22 either parallel with the line of draft or at any suitable angle relative to the line of draft dependent upon the height of the "hills" desired.

At each end of the beam 19 is a disk assembly indicated generally by the reference numeral 20. Since the disk assemblies 20 are identical a detail description of one will suffice.

It will thus be seen that each disk assembly 20 includes an axle member 21 on which are mounted concavo-convex disks 22 held in spaced relation through the medium of a bushing 23. The outer disk 22 is retained on the axle 21 between one end of the bushing 23 and a washer 24 against which bears a nut 25. The inner disk 22 is confined on the axle 21 between the adjacent end of the aforementioned bushing 23 and a shorter bushing 26 disposed between the inner disk 22 and the head of the axle 21.

The bushing 23 is provided with a peripheral groove 27 which accommodates the sections of a two-part bearing 28, the parts of which bearing are connected together through the medium of suitable screws 29 as best shown in Figure 7.

The bushing 26 is also provided with a peripheral groove which accommodates the sections of a two-part bearing 30, the parts of which are secured in assembled relation through the medium of a U-bolt 31 and a clamping plate 32.

As best shown in Figure 3 each disk assembly 20 is connected with one end of a cross beam 19 through the medium of a screw or the like 33 that extends through registering openings in the beam 19 and the plate 32 and is threadedly engaged with the upper section of the bearing 30 in a manner to bind against the bushing 26 to hold the same against rotation.

For securing the beam 19 at the desired angular adjustment relative to the line of draft there are provided bars 33 secured at one end to the respective disk assemblies 20 through the medium of screws 35 which are engaged in selected openings 33' in said one end of the bars 33 and which have threaded engagement with the upper section of the two-part bearings 28 as shown in Figure 3. The bars 33 converge toward the draft beam 8 and at their converging ends are provided with suitable spaced apertures for accommodating a bolt 34 whereby at said end the bars 33 are adjustably connected with the beam 8.

It will be understood that the connection 17a between the rear end of the draft beam 8 and the member 17 may be such as to permit the member 17 to swing in a vertical plane so that the digging depth of the disks 22 may be regulated at will.

For securing the disks 22 at the desired depth-adjustment there are provided bars 36 which at one end are secured to the respective disk assemblies through the medium of the aforementioned screws or bolts 35 as shown clearly in Figures 1 and 3. These bars 36 extend upwardly and forwardly and at their upper free ends are provided with series of apertures whereby they are adjustably secured to the handle bars 5 through the medium of the aforementioned bolts 15.

From the above it will be apparent that when the disk assemblies 20 have been adjusted to the proper angle relative to the line of draft and also adjusted vertically to control the digging depth of the disk, said disks, as the planter is drawn along, will serve to throw the dirt inwardly over the seed for building the "hill" or "bed" for the seed. In this manner the "hill" or "bed" of the desired height may be obtained.

Having thus described the invention, what is claimed as new is:

1. In an agricultural implement of the class described, a planter including, in combination, handle bars, a substantially Y-shaped brace member for said handle bars having the arms of the Y secured at one end to the handle bars and a hub on the free end of the stem of the Y, an axle journalled in said hub, planter wheels on said axle at opposite sides of said hub, an extension projecting rearwardly from said hub, a draft member pivotally connected to said extension, a cross beam pivotally connected with said draft member, a disk assembly mounted at each end of said cross beam, adjustment means connected with said cross beam for securing the latter at the desired angle relative to the line of draft, and additional means adjustably connecting the disk assembly with said handle for securing the disk assembly and beam at the desired elevation relative to the ground for controlling the digging depth of the disk of said assembly.

2. In an agricultural implement of the class described, a draft beam, a cross member supported on the draft beam intermediate the ends of the latter, handles extending upwardly and rearwardly from said cross member, a hub on the rear end of said draft beam, a brace member bracing the handles and hub relative to one another, an axle journalled in said hub, planter wheels on said axle at opposite ends of the hub, a draft beam extension projecting rearwardly from said hub, a relatively short draft member pivoted to said draft beam extension, a cross beam pivoted to said relatively short draft member, a disk assembly mounted at each end of said cross beam, each disk assembly including a pair of disks, brace bars connected at one end with said disk assemblies at a relatively opposite end with the draft beam for securing said draft beam and the disk assemblies associated therewith at a desired angle relative to the line of draft.

3. In an agricultural implement of the class described, a draft beam, a cross member supported on the draft beam intermediate the ends of the latter, handles extending upwardly and rearwardly from said cross member, a hub on the rear end of said draft beam, a brace member bracing the handles and hub relative to one another, an axle journalled in said hub, planter wheels on said axle at opposite ends of the hub, a draft beam extension projecting rearwardly from said hub, a relatively short draft member pivoted to said draft beam extension, a cross beam pivoted to said relatively short draft member, a disk assembly mounted at each end of said cross beam, each disk assembly including a pair of disks, brace bars connected at one end with said disk assemblies at a relatively opposite end with the draft beam for securing said draft beam and the disk assemblies associated therewith at a desired angle relative to the line of draft, and additional brace members connected at one end with the disk assembly and adjustably connected at a relatively opposite end with said handles for securing said disk assembly and beam at the desired elevation relative to the ground for controlling the digging depth of said disk.

ARTHUR ODER.
ANDREW J. DAVIS.